(12) United States Patent
Rabiller et al.

(10) Patent No.: US 6,366,859 B1
(45) Date of Patent: Apr. 2, 2002

(54) METHOD OF DETECTING BREAKS IN LOGGING SIGNALS RELATING TO A REGION OF A MEDIUM

(75) Inventors: Philippe Rabiller, Lescar; Frédéric Robail, Dainville, both of (FR)

(73) Assignee: Elf Exploration Production (FR)

( * ) Notice: Subject to any disclaimer, the term of this patent is extended or adjusted under 35 U.S.C. 154(b) by 0 days.

(21) Appl. No.: 09/554,035

(22) PCT Filed: Oct. 13, 1999

(86) PCT No.: PCT/FR99/02477

§ 371 Date: May 8, 2000

§ 102(e) Date: May 8, 2000

(87) PCT Pub. No.: WO00/22456

PCT Pub. Date: Apr. 20, 2000

(30) Foreign Application Priority Data

Oct. 14, 1998 (FR) .......................................... 98 12876

(51) Int. Cl.⁷ ................................................. G01V 5/04
(52) U.S. Cl. .......................................................... 702/8
(58) Field of Search ..................... 702/7, 8, 6; 324/338, 324/339, 303

(56) References Cited

U.S. PATENT DOCUMENTS

| 4,320,469 A | 3/1982 | Frawley et al. ............... 367/33 |
|---|---|---|
| 4,541,275 A | 9/1985 | Kerzner ........................ 73/152 |
| 5,663,929 A | 9/1997 | Pavone et al. ................. 367/82 |
| 5,673,191 A | 9/1997 | Chapin et al. .............. 364/420 |

OTHER PUBLICATIONS

A. Prokoph, et al., "Detection of Nonstationarities in Geological Time Series: Wavelet Transform of Chaotic and Cyclic Sequences", *Computers & Geosciences*, vol. 22, No. 10, 1996, pp. 1097–1108.

X. Chen, et al., "Well Log Correlation Based on Wavelet Transform and Knowledge", *IEEE International Conference on Intelligent Processing Systems*, 1997, pp. 1217–1219.

Primary Examiner—Donald E. McElheny, Jr.
(74) Attorney, Agent, or Firm—Ostrolenk, Faber, Gerb & Soffen, LLP

(57) ABSTRACT

Method of detecting breaks in logging signals consisting of logs of different kinds recorded as a function of depth, of the type consisting in selecting a portion from each of the said logs in such a way that all the selected portions have a same depth interval in common, one of the selected portions being regarded as reference portion; selecting a parent wavelet function and constructing, from the said parent function, a family of wavelet analysis functions dependent on spatial frequency and on depth, the said method being characterized in that it furthermore consists in calculating, for each portion of log selected and for each depth datum, the absolute value of the mean gradient of the characteristic quantity of the wavelet transform for the various spatial analysis frequencies; selecting, for each portion of log processed, the peaks of the absolute value of the mean gradient of the characteristic quantity.

13 Claims, 4 Drawing Sheets

METHOD OF DETECTING BREAKS IN LOGGING SIGNALS RELATING TO A REGION OF A MEDIUM

The present invention relates to a method of detecting breaks in logging signals relating to a region of a medium, the logging signals being made up of logs of different kinds recorded for the said region as a function of depth, and the application of this method to a depthwise readjustment of the said logs.

In numerous fields, it is necessary to rapidly correlate two or more curves representing the variations of a first quantity as a function of a second quantity, for purposes of comparison, fitting, etc.

The curves to be compared may be of the same kind, that is to say represent the variations of one and the same first quantity as a function of one and the same second quantity, or of different kinds. They may for example be recordings of one and the same physical phenomenon which are however shifted in time or space, or recordings relating to different physical phenomena or else recordings relating to one and the same physical phenomenon recorded for example by different methods so that their frequency content is different.

The correlations may be performed numerically. The result obtained is generally global and rather unreliable if no constraining assumptions are made regarding the signals, the method then consisting in choosing between several autocorrelation peaks. The correlation can be performed visually, by manually shifting one of the curves with respect to the other along the axis of the second quantity. In this way, optimal similitude is sought over one or more portions of the curve via successive shifts. This method makes it possible to take account of prior knowledge. It is this one which is commonly employed in geophysics for the depthwise or timewise adjusting of seismic horizons or for the correlating of recordings performed in a well and of seismic recordings.

The main drawback of such a method lies in the difficulty in comparing signals of possibly very different shapes, for example if their frequency content is different.

A process for analysing a signal, termed the wavelet analysis process, is known which makes it possible to decompose the said signal as a sum of elementary wavelet functions $\Psi_{a,b}$, which each vibrate as sinusoids over a range whose position on an axis is linked to the parameter b and whose width is linked to the parameter a (central frequency), and which are very strongly damped outside this range. The decomposition of a signal with the aid of a family of these wavelets constitutes what is referred to as a "time/frequency" analysis, since the first and most common decompositions were performed on recordings of the variations of a first quantity as a function of time (the second quantity). In this case, the dimension of the parameter b is that of a time and the dimension of the parameter a is the dimension of the inverse of a time, hence of a temporal frequency.

For further information regarding wavelet decomposition or "time/frequency" analyses, reference may be made to the article "L'analyse par ondelette" [Wavelet analysis] by Yves MEYER et al., published in "Pour la Science" of September 1987, to the work "Wavelets" by J. N. COMBES et al. published by Springer-Veriag, or else to the international patent application published under No. WO 92/18941, which documents are incorporated into the present application.

Several types of functions may be used, making it possible to define numerous families of wavelets having different properties. The latter may for example be gaussian, boxcar or triangular functions, real or complex functions, which may or may not be mutually orthogonal. Reference will be made to the above-cited article to ascertain the constraints applicable to these various functions and to others in order to generate wavelet families.

For a specified family of wavelets $\Psi_{a,b}$, the "wavelet transform" in two dimensions z and x, which is associated with a recording s(z) along the z axis, is defined as the sequence of coefficients $C_{a,b}$ which each correspond to the integral of the product of the recording s(z) to be analysed times the elementary analysis wavelet $\Psi_{a,b}$ according to the values of b along the z axis and the values of a along an x axis. In the case where complex wavelets have been chosen to perform the time/frequency analysis of a recording or of a signal, it becomes possible to define the real part, the imaginary part, the modulus or else the phase of the wavelet transform. The coefficients $C_{a,b}$ are calculated through the well known formula:

$$C_{a,b} = \int_{-\infty}^{+\infty} S(z)_{a,b}(z) dz$$

Methods and devices for identifying geological structures using wavelet transforms are described in particular in patents U.S. Pat. No. 5,673,191, U.S. Pat. No. 5,740,036 and U.S. Pat. No. 5,757,309 and in the article entitled "Detection of non stationarites in geological time series: wavelet transform of chaotic and cyclic sequences", by Andreas PROKOPH et al, published in Computers and Geosciences, Vol. 22, N° 10, pages 1097–1108, 1996.

However, these latter documents relate either to magnetic and gravitational measurements for distinguishing between relatively deep geological structures and shallow structures, or to means for simulating the succession of structures.

The present invention relates to a method of detecting breaks in logging signals, which uses a wavelet analysis of the said signals.

It is known that the analysis of the logging signals obtained with the aid of well known devices makes it possible to determine the mineralogy, the texture, the type of porous lattice and the fluid content of the formations through which boreholes are drilled. The depthwise alterations in the signals reflect the alterations in the properties of the formations and make it possible to chart their structural and diagenetic sedimentary history.

Within the logging signals it is possible to distinguish breaks which correspond to significant modifications of the nature of the formations which occur over a small depth interval.

Electrofaciological beds may be characterized on the basic of the breaks plotted on at least one of the channels of the logging signal. Inside a bed, each channel of the logging signal shows a continuous variation, on a given depth resolution scale. The noteworthy breaks are used by the geologist for lithostratigraphic correlation purposes. In certain cases, chronostratigraphic correlations are possible by performing an interpretation on the basis of a conceptual model of the alterations of the sedimentary deposits.

Specialists performing the analysis of the logging signals use the noteworthy breaks, in the first step of the interpretation, for the depthwise readjustment of the various signals recorded by the sensors of the logging device which are not all located in front of the same formation at the same time. On either side of the breaks, the logging signal suffers from a shoulder effect over an interval which depends on the resolution of the logging devices and on the contrast of the characteristic logging responses of the formations. This shoulder effect is a source of errors and uncertainty in the interpretations.

The present-day processes for interpreting logging signals are based on processing each sample of the logging signal independently of the samples lying above and below the processed sample, the concept of depth not being involved. Accordingly, the information carried by the alterations of the signal with depth is not taken into account. In order for this information to be taken into account, it is necessary to define breaks over the logging signal and alterations inside the breaks.

The determination of breaks is currently performed manually and requires an experienced operator. The result is both subjective and difficult to reproduce identically. However, these breaks which correspond to the limits of beds or of formations are necessary for depthwise readjustment.

Depthwise readjustment is a fundamental step in all interpretation of logs, since it consists in resetting to the same depth measurements performed by the various sensors of the logging devices, which do not pass simultaneously in front of the same point of the well.

Two types of readjustments are distinguished:
"intra run" readjustments, which relate to measurements recorded during the same ascent of a set of mechanically interlinked sensors;
"between runs" readjustments, which are facilitated by always recording a common log in the various runs, this common log generally being the "gamma ray" log which serves as depth reference.

A first readjustment is performed at the time of acquisition and relates only to the measurements performed during the same recording. It is satisfactory only in the best cases and always has to be checked.

There are in existence stations for analysing logs and with the aid of which it is possible to make readjustments. However, the readjustment operations remain manual or, when they are automatic, they relate only to logs of the same kind, the analysis stations being unable automatically to analyse logs of different kinds. Therefore, only readjustments between runs are possible. Moreover, the current processes, based on correlations, do not make it possible to identify, hierarchize and assign a quality index to the correlations.

The aim of the present invention is to propose a method which makes it possible automatically to detect breaks in logging signals or logs and which is able to be applied in respect of depthwise readjustment of the logs recorded.

The subject of the present invention is a method of detecting breaks in logging signals relating to a region of a medium and consisting of logs of different kinds recorded for the said region as a function of depth, of the type consisting in:
selecting a portion from each of the said logs in such a way that all the selected portions have a same depth interval in common, one of the selected portions being regarded as reference portion,
determining a sequence of spatial analysis frequencies,
selecting a parent wavelet function and constructing, from the said parent function, a family of wavelet analysis functions dependent on spatial frequency (or wavenumber) and on depth,
calculating a wavelet transform of the selected portion of each log and for each analysis frequency,
choosing a characteristic quantity of the wavelet transform and in using this quantity as a representation of the wavelet transform, the said method being characterized in that it furthermore consists in:
calculating, for each portion of log selected and for each depth datum, the absolute value of the mean gradient of the characteristic quantity of the wavelet transform for the various analysis frequencies,
selecting, for each portion of log processed, the peaks of the absolute value of the mean gradient of the characteristic quantity, each peak corresponding to a break,
determining the corresponding breaks over the reference log portion,
defining an analysis window centred on each break of the reference log portion, and
selecting the breaks of the other log portions which lie in the analysis window.

An advantage of the present invention lies in the fact that all the curves representative of the various logs recorded are taken into account and processed rapidly (simultaneously or sequentially one after another).

Moreover, the method according to the invention makes it possible to circumvent the shoulder effects linked with the resolution (effectiveness) of the logging devices so as to chop the intervals supplying the logs into beds and to be able to analyse the vertical alterations in their various geological characteristics.

According to another characteristic, the result of the wavelet transform is a complex number and the characteristic quantity of the wavelet transform is the real part of the said complex number. The parent function may for example be a function of the type $f(z)=(1-z^2)\exp(-z^2/2)$.

According to another characteristic, the absolute value of the mean gradient is normalized, the peaks of the absolute value of the mean gradient which are selected are greater than or equal to a predetermined threshold. In particular, the absolute value of the mean gradient is normalized and the threshold for selecting the peaks is equal to or greater than 0.2.

According to another characteristic, the log supplying the reference portion is obtained by gamma ray logging, the said (gamma ray) log being an excellent depth reference since it can be recorded in all types of drilling mud and even through a casing.

According to another characteristic, each processed portion of log is included within an interval of study containing a predetermined number of samples N. In particular, when the number of samples to be processed in a log portion is either less than or greater than the number of samples N of the interval of study, the log is either centred in the said interval and the empty parts of the latter are filled with samples having a value equal to the mean value of the log, or else it is divided into at least two parts each comprising a number of samples less than N, in such a way as to process each part as indicated above.

According to another characteristic, the succession of the spatial analysis frequencies used for the calculation of the wavelet transform has as limits a frequency corresponding to a wavelength of 4 m and a frequency corresponding to a wavelength of 200 m. The succession of the said frequencies is for example a geometric progression. Preferably, ten spatial frequencies are selected, the limits of which correspond to wavelengths of 10 m and 100 m.

Each spatial frequency is analysed independently of the others, without successive filtering. Moreover, choosing the frequencies makes it possible to have a number of wavelet coefficients which is sufficient to carry out a study of their spatial organization, in the depth/frequency plane. In this way, three-dimensional information is obtained linking the depth, the frequencies present in the starting logging signal and the amplitude of the transform.

Thus, the method according to the invention makes it possible to study, for each depth datum, the logging signal at various scales, that is to say over depth intervals whose size differs.

The method according to the invention makes it possible to hierarchize the breaks according to various logging criteria and to give priorities (or quality criteria) in the references which are used in particular in the depth readjustment. Thus, it is possible automatically to process both an "intra run" readjustment and a "between runs" readjustment.

Other advantages and characteristics will be better apparent from reading a preferred embodiment of the method according to the invention, as well as of the appended drawings in which.

Figure 1:
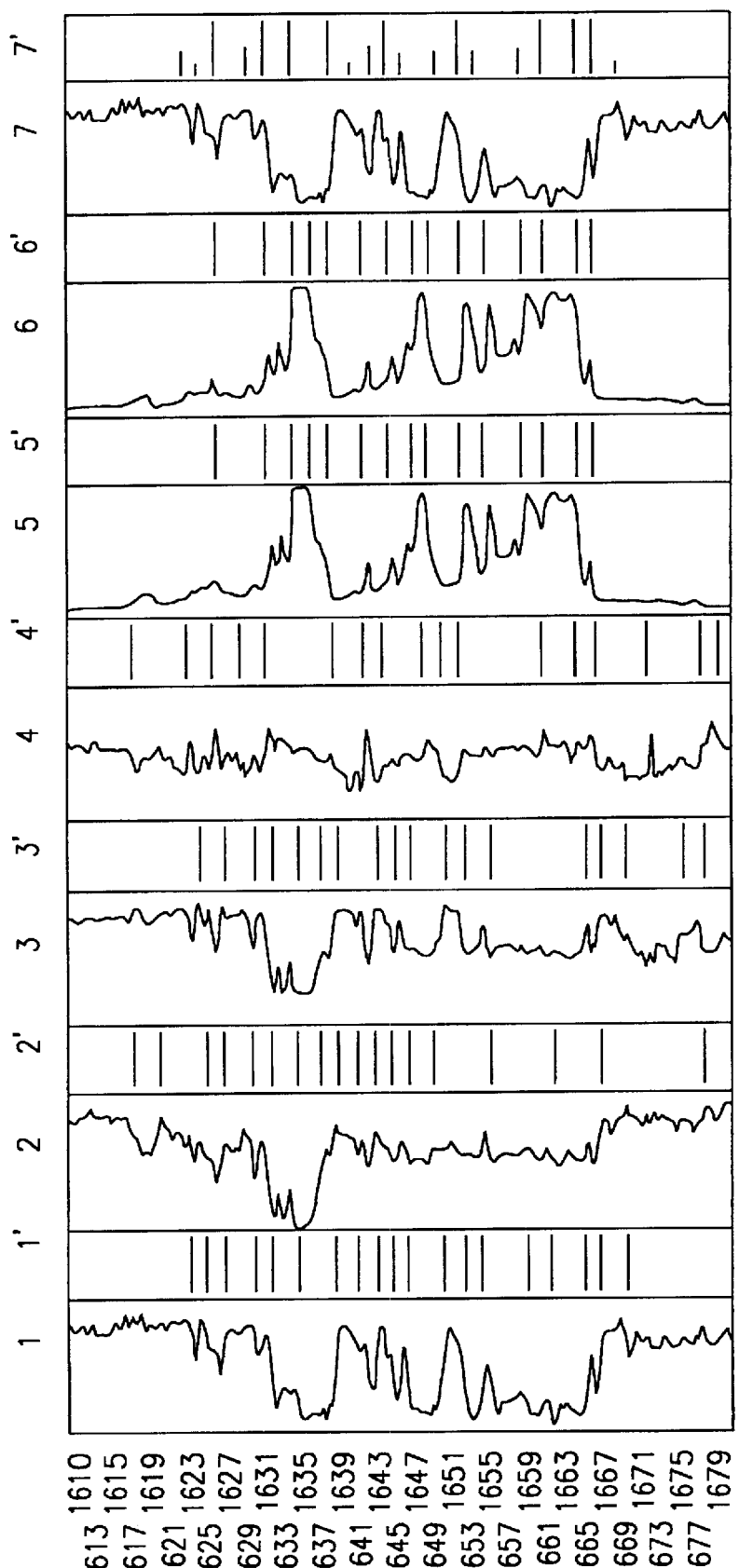
FIG. 1 is a representation of the breaks over a set of non-readjusted logs, comprising a gamma ray log as reference.

For a given medium to be explored, various logs are recorded as a function of depth and correspond to a region of the said medium. In the example of FIG. 1, six logs referenced 1 to 6 have been recorded. Log 1 is obtained by gamma ray logging and constitutes a gamma ray log; log 2 corresponds to a recording representing the hydrogen index and it is usually referenced NPHI. Log 3 corresponds to the density of the rock in place in the relevant region, and it is referenced RHOB; log 4 corresponds to the slowness Dt in the said relevant region; logs 5 and 6 correspond to resistivities designated by LLS to represent the shallow resistivity and by LLD to represent the deep resistivity.

In each log 1 to 6 a portion is selected which relates to the same depth interval, then from these log portions is chosen a portion which is used as reference portion. In the example represented in FIG. 1, the reference portion is that of the gamma ray.

In another step, a parent wavelet function is selected, for example the MORLET wavelet function or better still the function referred to as the "Mexican hat" wavelet function, of the type $f(z)=(1-z^2)\exp(-z^2/2)$ which is equivalent to a "gaussian" smoothing whose second derivative is taken. A family of analysis functions which depends on spatial frequency and on depth is constructed from the parent wavelet function, as is known and recalled above. In the present case, ten analysis frequencies are chosen, the limits of which lie between a frequency $F_1$ corresponding to a wavelength $\lambda$ of 10 m and a frequency $F_{10}$ corresponding to a wavelength of around 100 m, the succession of analysis frequencies $F_1$ to $F_{10}$ decreasing in accordance with a geometric progression, of common ratio 1.24 for example.

Each log 1 to 6 or rather each selected portion of log is thus processed with the aid of the wavelet transform, doing so for each analysis frequency.

Figure 2:
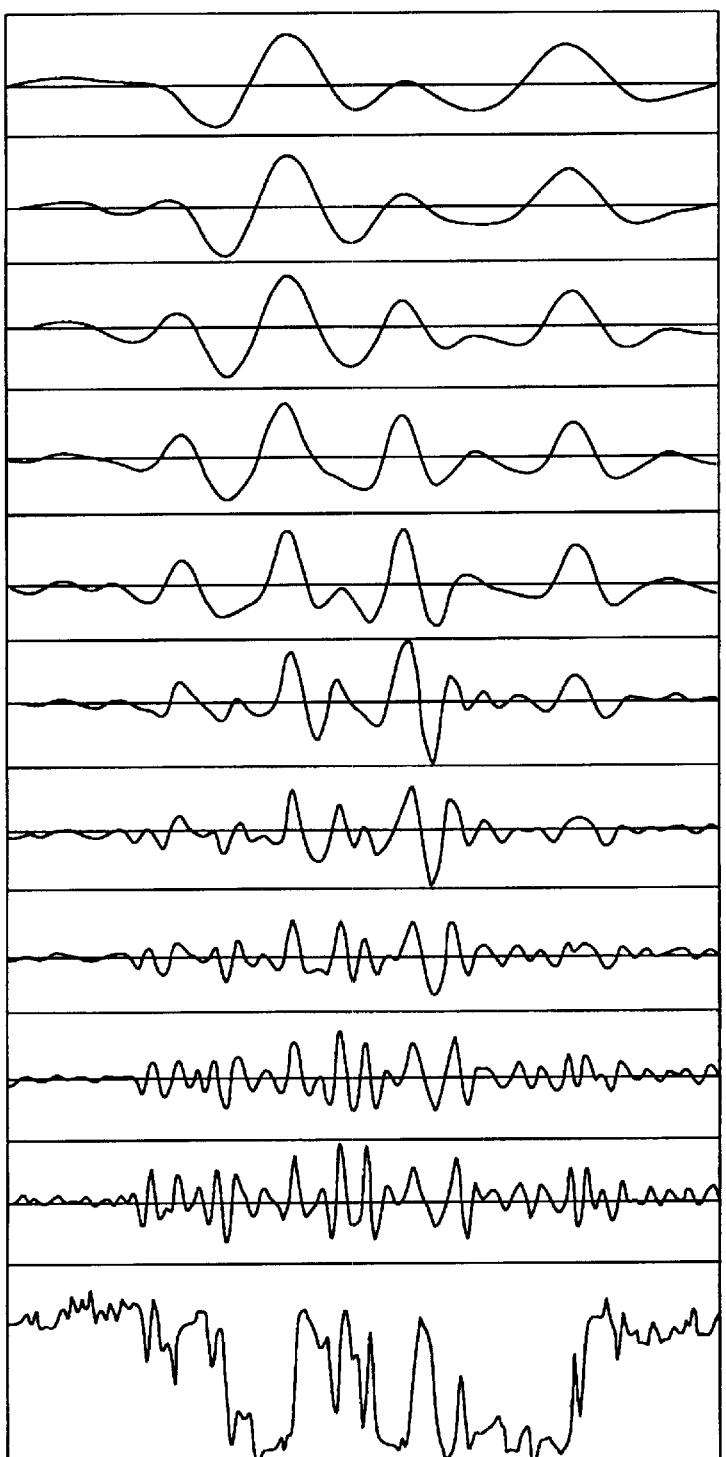
FIG. 2 is a representation of the real part of the coefficients of the wavelet transform of the reference log.

The result of the wavelet transform is a coefficient represented by a complex number, only the real part of which is preserved as characteristic quantity. FIG. 2 represents the real part of the coefficients of the wavelet transform for the reference portion of the gamma ray log, the values increasing from left to right. The column situated immediately after the gamma ray log 1 in FIG. 2 corresponds to the real part of the coefficients of the wavelet transform for the first frequency $F_1$, the next column corresponding to the real part of the coefficients of the wavelet transform for the frequency $F_2$, and so on and so forth on moving to the right up to the frequency $F_{10}$.

Figure 3:
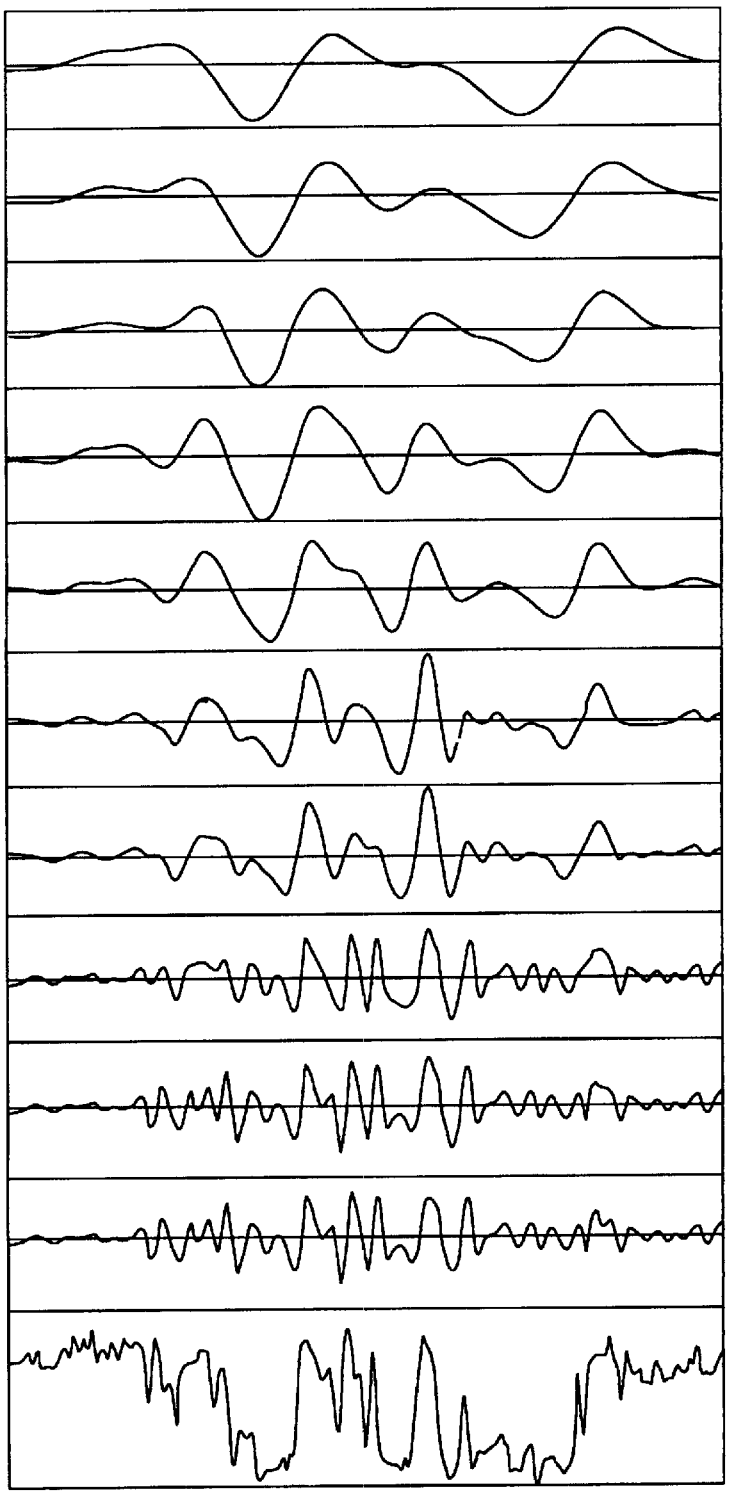
FIG. 3 is a representation of the gradient of the real part of the coefficients of the wavelet transform of the reference log.

For each datum of each log portion analysed, the absolute value of the mean gradient of the real part of the complex number of the result of the wavelet transform is calculated. In FIG. 3, the gradient of the real part of the coefficients of the wavelet transform has been represented for the reference portion selected in the gamma ray, as with regard to FIG. 2. Thus, the column following the gamma ray situated furthest to the left, alongside the depth scale in metres, corresponds to the gradient of the real part represented in FIG. 2 and corresponding to the initial frequency $F_1$. To each frequency $F_2$, $F_3$ ... $F_{10}$ there corresponds a gradient of the real part.

We proceed likewise for each of the logs 2 to 6, that is to say each log is processed with the aid of the family of wavelet analysis functions emanating from the name parent wavelet function, in such a way that to each log there corresponds a representation of the gradient of the real part of the wavelet transform for each of the analysis frequencies $F_1$ to $F_{10}$.

Figure 4:
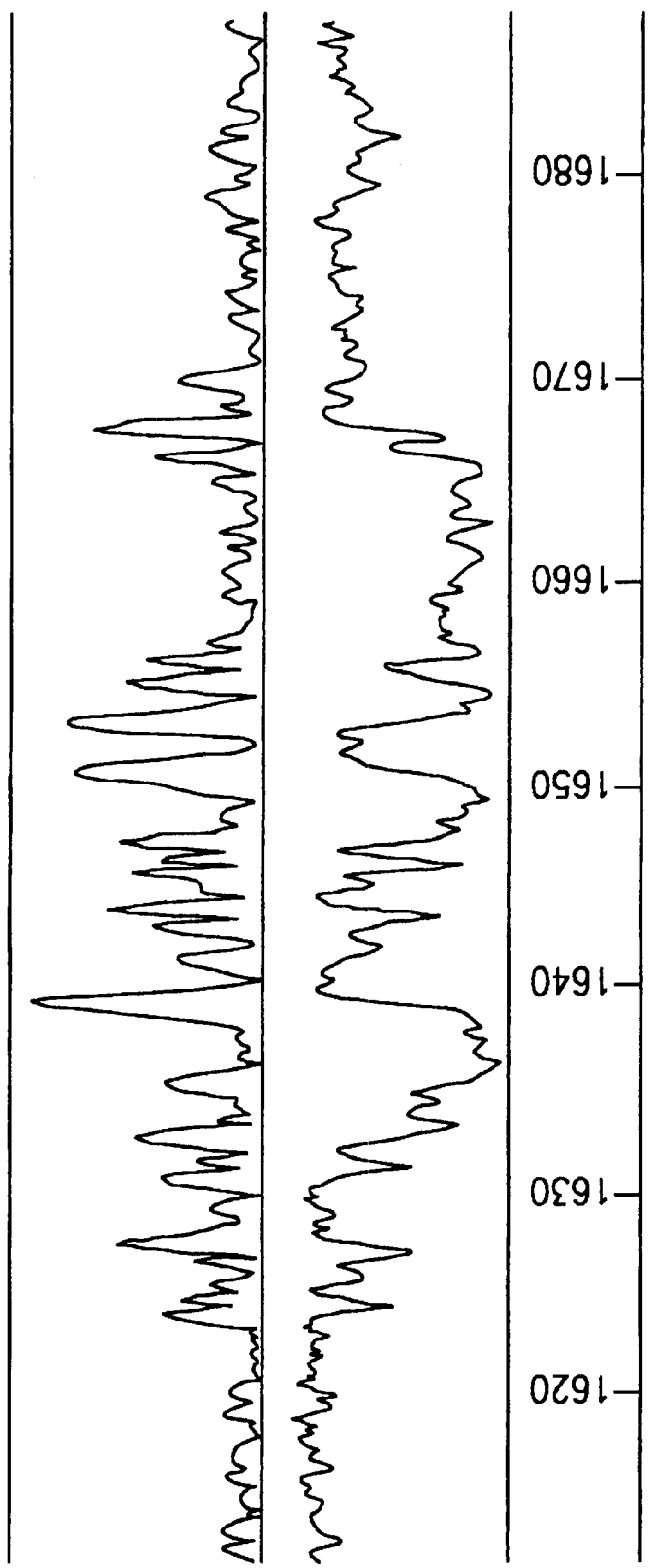
FIG. 4 is a representation of the absolute value of the normalized mean gradient for the reference log.

In another step, the absolute value of the mean gradient of the real part chosen as characteristic quantity of the wavelet transform is calculated for each portion of log selected and for each depth datum, on the basis of the absolute values of the gradients determined for the set of analysis frequencies $F_1$ to $F_{10}$. By referring to FIG. 3 and for each depth datum, for example the death datum 1613, the mean gradient is calculated by taking, for example, the arithmetic mean of the values of the gradient for each datum and for each of the frequencies $F_1$ to $F_{10}$. Next, for each portion of log selected, the peaks of the absolute value of the mean gradient are selected. In FIG. 4, representing the normalized mean gradient which corresponds to the gamma ray log alone, it may be seen that between 1610 and 1623 m, the mean gradient for each depth datum lying between 1610 and 1623 m is relatively small, the first peak appearing for the datum 1623 m. Gradually, it is observed that there is a significant peak for the datum 1625 m, other peaks at 1638 m, 1650 m, 1653 m and so on. To each value of the mean gradient there corresponds a sought-after break.

Preferably, and for each depth datum, only the peaks of the absolute value of the mean gradient which are greater than a predetermined threshold are selected. For example, the absolute value of the mean gradient is normalized and only the peaks greater than the threshold 0.2 are retained.

FIG. 1 supplies, alongside each portion 1 to 6 of log selected, a representation of the peaks selected for each depth datum and therefore of the breaks which have been determined by virtue of the present invention. The sequence of breaks in the column referenced 1' corresponds to the series of peaks greater than 0.2, for the gamma ray log portion. As may be observed, for the interval of depth represented, a break has been determined for the datum 1623, another for the datum 1625 m, another for the datum 1626 m and so on. Column 2' represents the series of breaks determined for the NPHI log portion, column 3' representing the series of breaks determined for the RHOB log portion and so on.

For reasons of clarity and compactness, the portions of log selected lie between the depth datum 1610 m and the depth datum 1679 m. In reality and preferably, the log portions selected are included within an interval of study which comprises a given number N of logging samples, for example 4096 samples. If a sampling spacing of 15.24 cm (½ a foot) is considered, this represents a length of log of 624 metres instead of the 69 metres indicated in FIGS. 1 to 3.

As indicated previously, N samples are processed in each portion of log selected.

When the portion of log to be processed comprises fewer than the fixed number N of samples, 4096 in the present case, the portion of log is recentred in the set of 4096 samples. For example, if the portion of log selected comprises 2000 samples, a log of 4096 samples is created, of which the first 1048 and the last 1048 are assigned the mean value of the log, the other 2000 samples corresponding to the original log.

When the portion of log selected comprises more samples that the fixed number N, for example greater than 4096, the said portion is cut into two and each half is processed as if it contained fewer than 4096 samples, in the manner indicated above.

According to the invention, it is preferable to search for the relevant breaks in each log. To this end, a relevance window is defined which is centred in succession on each break of the log under consideration, and for each position of the said relevance window a relevance coefficient is calculated, defined by the expression:

$$(\log_{max}-\log_{min})\text{window}/\log_{max}-\log_{min})\text{portion}$$

in which:

$\log_{max}$ and $\log_{min}$ in the window represent the maximum and minimum amplitudes of the logging signal situated in the window, $\log_{max}$ and $\log_{min}$ in the portion of log processed represent the maximum and minimum amplitudes of the processed portion of the logging signal.

Such an operation contributes to eliminating the problems linked to noise in the logging signals recorded.

For each log, only the breaks for which the relevance coefficient is greater than a given value are retained. Columns 1' to 6' represent the breaks retained with the aid of the above calculation for logs 1 to 6 respectively.

So as to retain or select only the interesting breaks which correspond from one log to another, the present invention advocates that the breaks retained on each of the portions of log selected be hierarchized. To do this, an analysis window is defined which covers a given number M of samples, equal to 5 for example. For each break of the reference log, the analysis window is centred on this break and the other logs are searched in order to find the breaks which are situated in the said window. Each break determined on one or more logs, in the window under consideration, is associated with the break of the reference log on which the window was centred. After this, the breaks can be mutually hierarchized, by operating for example as follows.

In the columns of the breaks, it may be seen that a break determined for the datum 1623 m in column 1' is also present only in column 4' and absent from the other columns 2', 3', 5 and 6'. Since it is present only in one column 4' other than the reference column 1', the coefficient one is assigned to it. The break determined at around 1626 m in column 1' is present in columns 2', 3', 5' and 6'; the coefficient four is assigned to it. The break determined at 1631 m in column 1' is also present in each of the other columns 2' to 6': the coefficient five is assigned to it and this operation is repeated for each of the breaks of the column 1'. The hierarchization is represented in column 7' of FIG. 1. In this column 7', it may be observed that there are four breaks having the coefficient 5, five breaks having the coefficient four, and so on.

Because they correspond to noteworthy geological events, breaks are used for depthwise readjustment of logs. A depth readjustment of logs consists in resetting to the same depth measurements performed by various sensors which do not pass simultaneously in front of the same point of the well. To perform an automatic depthwise readjustment, breaks are detected on each log, in the manner indicated above. Likewise, a search is made for the breaks existing on the other logs visible in a depth window centred on each break plotted on the reference log. When a break is detected on one or more logs, it is associated with the break detected on the reference log. The values of the logs are recalculated in such a way that the breaks associated with each of the breaks of the reference log appear at the same depth datum as the relevant break of the reference log.

What is claimed is:

1. Method of detecting breaks in logging signals relating to a region of a medium and consisting of logs of different kinds recorded for the said region as a function of depth, of the type consisting in:

selecting a portion from each of the said logs in such a way that all the selected portions have a same depth interval in common, one of the selected portions being regarded as reference portion, determining a sequence of spatial analysis frequencies, selecting a parent wavelet function and constructing, from the said parent function, a family of wavelet analysis functions dependent on spatial frequency and on depth, calculating a wavelet transform of the selected portion of each log and for each spatial analysis frequency, choosing a characteristic quantity of the wavelet transform and in using this quantity as a representation of the wavelet transform, the said method being characterized in that it furthermore consists in:

calculating, for each portion of log selected and for each depth datum, the absolute value of the mean gradient of the characteristic quantity of the wavelet transform for the various spatial analysis frequencies, selecting, for each portion of log processed, the peaks of the absolute value of the mean gradient of the characteristic quantity, each peak corresponding to a break, determining the corresponding breaks over the reference log portion, defining an analysis window centred on each break of the reference log portion, and selecting the breaks of the other log portions which lie in the analysis window.

2. Method according to claim 1, characterized in that the result of the wavelet transform is a complex number and in that the Characteristic quantity of the wavelet transform is the real part of the said complex number.

3. Method according to claim 1, characterized in that the selected peaks of the absolute value of the mean gradient are greater than or equal to a predetermined threshold.

4. Method according to claim 3, characterized in that the absolute value of the mean gradient is normalized and in that the said threshold is greater than or equal to 0.2.

5. Method according to claim 1, characterized in that the log supplying the reference portion is a log obtained by gamma ray logging.

6. Method according to claim 1, characterized in that each portion of log is included within an interval of study containing a predetermined number of samples N.

7. Method according to claim 6, characterized in that when a log intended to supply a selected portion is made up of a number of samples which is less than the number N, the said log is centred in the interval of study and the empty parts of the said interval are filled with samples having a value equal to the mean value of the log.

8. Method according to claim 6, characterized in that when a log intended to supply a selected portion is made up of a number of samples which is greater than the number N, the said log is divided into at least two parts each having a number of samples less than the number N.

9. Method according to claim 1, characterized in that the spatial analysis frequencies selected for the calculation of the wavelet transform have limit frequencies corresponding to a wavelength of 4 m and to a wavelength of 200 m.

10. Method according to claim 9, characterized in that ten spatial frequencies are selected, the limit frequencies of which correspond to wavelengths of 10 m and 100 m.

11. Method according to claim 9, characterized in that the succession of spatial analysis frequencies is a geometric progression.

12. Method according to claim 1, characterized in that the parent wavelet function is a function of the type $f(z)=(1-Z^2)\exp(-z^2/2)$ in which z is the depth.

13. Method of depthwise readjustment of logs of different kinds recorded for a region of a medium as a function of depth, characterized in that it consists in determining breaks over a log portion chosen as reference and over corresponding portions of the other logs by applying the method according to claim 1 and in recalculating the values of the said other portions of log in such a way that the breaks of the said portions, which are associated with each of the breaks of the log portion chosen as reference, appear at the same depth datum as the relevant break of the reference log.

* * * * *